United States Patent [19]
Bozarth, Jr.

[11] 3,898,447
[45] Aug. 5, 1975

[54] ANALOG ARITHMETIC CIRCUIT

[75] Inventor: Theodore B. Bozarth, Jr., Perkasie, Pa.

[73] Assignee: Honeywell Inc., Minneapolis, Minn.

[22] Filed: July 19, 1974

[21] Appl. No.: 490,027

Related U.S. Application Data

[63] Continuation of Ser. No. 393,572, Aug. 31, 1973, abandoned.

[52] U.S. Cl. .................... 235/194; 307/246; 320/1; 328/78

[51] Int. Cl.[2] .......................................... G06G 7/16

[58] Field of Search ........... 235/194, 195, 196, 197; 307/246, 294, 229; 328/66, 67, 68, 78; 320/1

[56] References Cited

UNITED STATES PATENTS

| | | | |
|---|---|---|---|
| 3,440,414 | 4/1969 | Miller | 235/197 |
| 3,549,874 | 12/1970 | Vachitis | 235/194 X |
| 3,564,287 | 2/1971 | Todd | 307/246 X |
| 3,585,634 | 6/1971 | Sharples | 320/1 X |
| 3,676,661 | 7/1972 | Sprowl | 320/1 X |

*Primary Examiner*—Joseph F. Ruggiero
*Attorney, Agent, or Firm*—Arthur H. Swanson; Lockwood D. Burton; Mitchell J. Halista

[57] ABSTRACT

An analog arithmetic circuit has a modulator circuit for coverting an analog direct current input signal into a variable duty cycle signal with the duty cycle being controlled by the amplitude of the analog input signal. The variable duty cycle signal is subsequently applied to a demodulator circuit. The demodulator circuit is driven by the variable duty cycle signal to produce a switching signal for energizing a second switching device arranged to control the application of a third analog signal to an output circuit. The switching of the second switching device is maintained in phase with the operation of the first switching device to produce an output analog signal having a predetermined relationship to the three input analog signals.

7 Claims, 3 Drawing Figures

PATENTED AUG 5 1975

3,898,447

SHEET 2

ANALOG ARITHMETIC CIRCUIT

This is a continuation of application Ser. No. 393,572 filed on Aug. 31, 1973, now abandoned.

BACKGROUND OF THE INVENTION

1. Field of the invention

The present invention relates to analog arithmetic circuits such as those which may be found in class 235, subclass 194 of the U.S. Patent Office Classification System. More specifically, the present invention is directed to arithmetic circuits on analog input signals to produce an analog output signal having a predetermined relationship to the combined effect of a plurality of analog input signals applied to the arithmetic circuit.

2. Description of the Prior Art

Examples of prior art analog arithmetic circuits may be found in U.S. Pat. Nos. 2,998,186; 3,016,197; 3,302,807; 3,383,501; 3,634,671 and 3,686,513. Prior art arithmetic circuits of the type shown in the aforesaid examples usually have had the disadvantage of being limited in one or more aspects of their overall operation. Specifically, the prior art arithmetic circuits have either been limited as to their utility in performing varied arithmetic operations by being restricted to a minimum number of arithmetic functions or they have not been suitable for use in an electrical signal isolation operating mode. Further, they have usually employed a precision constant frequency oscillator for providing a basic signal to be modified in accordance with input signals to the arithmetic circuits and, hence, have been dependent on the accuracy of the constant frequency generator.

SUMMARY OF THE INVENTION

Accordingly, it is an object of the present invention to provide an improved arithmetic circuit for providing a plurality of arithmetic operations.

Another object of the present invention is to provide an improved arithmetic circuit suitable for use with electrical isolating elements for providing conductive isolation between an output of the arithmetic circuit and an input thereof.

In accomplishing; these and other objects, there has been provided, in accordance with the present invention, an analog signal arithmetic circuit having a modulating circuit for modulating a first input signal to provide a variable duty cycle output signal in accordance with the amplitude of a second input signal to the modulating circuit. The variable duty output signal is applied to a demodulator circuit to control the modulation of a third input signal to the arithmetic circuit to provide an output signal having a amplitude corresponding to the predetermined effect of the three input signals to the arithmetic circuit.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

DETAILED DESCRIPTION

Figure 1:
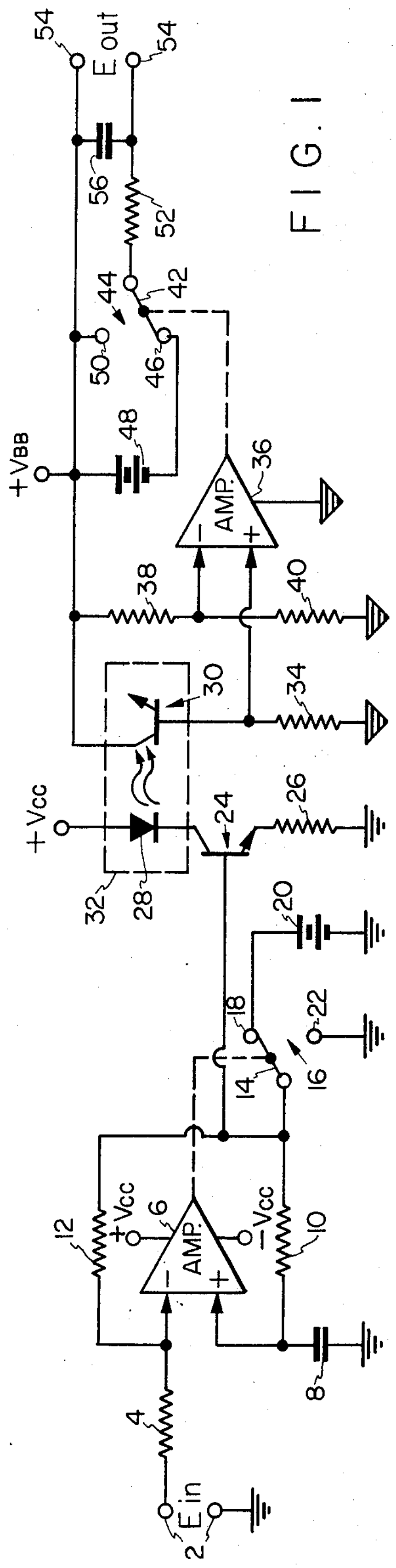
FIG. 1 is a schematic illustration of an arithmetic circuit embodying the present invention.

Referring to FIG. 1 in more detail, there is shown an arithmetic circuit embodying the present invention. A pair of input terminals 2 are arranged to be connected to a source of an input signal Ein. The input terminals 2 are connected through an input resistor 4 to the inverting, or negative, input of signal comparator amplifier 6. The non-inverting, or positive, input of the comparator amplifier 6 is connected through a capacitor 8 to a common, or ground, terminal and through a pair of serially connected feedback resistors 10 and 12 to the inverting input terminal of the amplifier 6. The amplifier 6 is arranged to compare the applied input signals and to operate an output switch by means of a relay coil (not shown) energized by an output signal from the amplifier 6 mechanically connected to the movable armature 4 of a single-pole, double-throw switch 16. The switches shown in FIG. 1 are shown as mechanical switches for the purpose of explaining the operation of the circuit. A first stationary contact 18 of the switch 16 is connected to the positive side of a constant voltage source shown as a battery 20 while the negative side of the battery 20 is connected to the ground terminal. A second stationary contact 22 of the switch 16 is connected to the ground terminal. The armature 14 of the switch 16 is electrically connected to the connection between the aforesaid pair of serially connected feedback resistors 10 and 12. This intermediate connection point is also connected to the base of an output transistor 24 having its emitter connected through the emitter resistor 26 to the ground terminal and its collector connected through a light emitting diode 28 to a source of energizing potential +Vbb.

The light emitted from the light emitting diode 28 is arranged to affect a photo-diode 30 to produce a change in the resistance of the photo-diode 30. The light emitting diode 28 and the photo-diode 30 are arranged to be enclosed in the light-tight receptacle 32 to form an opto-electric isolator element. One end of the photo-diode 30 is connected to a source of energizing potential +Vbb while the other end of the photo-diode 30 is connected to the ground terminal through a resistor 34 and to a non-inverting input of second amplifier 36. A pair of resistors 38 and 40 are serially connected between the source of potential +Vbb and the ground terminal while the connection between the resistors 38 and 40 is connected to the inverting input terminal of the amplifier 36. The amplifier 36 is arranged to actuate an output switch by means of a relay coil (not shown) energized by an output signal from the amplifier 36 and connected to a movable armature 42 of a single-pole, double-throw switch 44.

A first stationary contact 46 of the switch 44 is connected to the negative terminal of a second constant voltage source shown as a second battery 48 having an output potential equal to the output potential of the first battery 20. The positive terminal of battery 48 is connected to the potential source +Vbb while a second stationary terminal 50 of the switch 44 is also connected to the energizing source +Vbb. The movable armature 42 of the switch 44 is electrically connected through a resistor 52 to one of a pair of output terminals 54 having an output voltage Eout appearing thereacross. The other one of the pair of output terminals 54 is connected to the potential source +V while a capacitor 56 is connected across the pair of output terminals 54.

Figure 2:
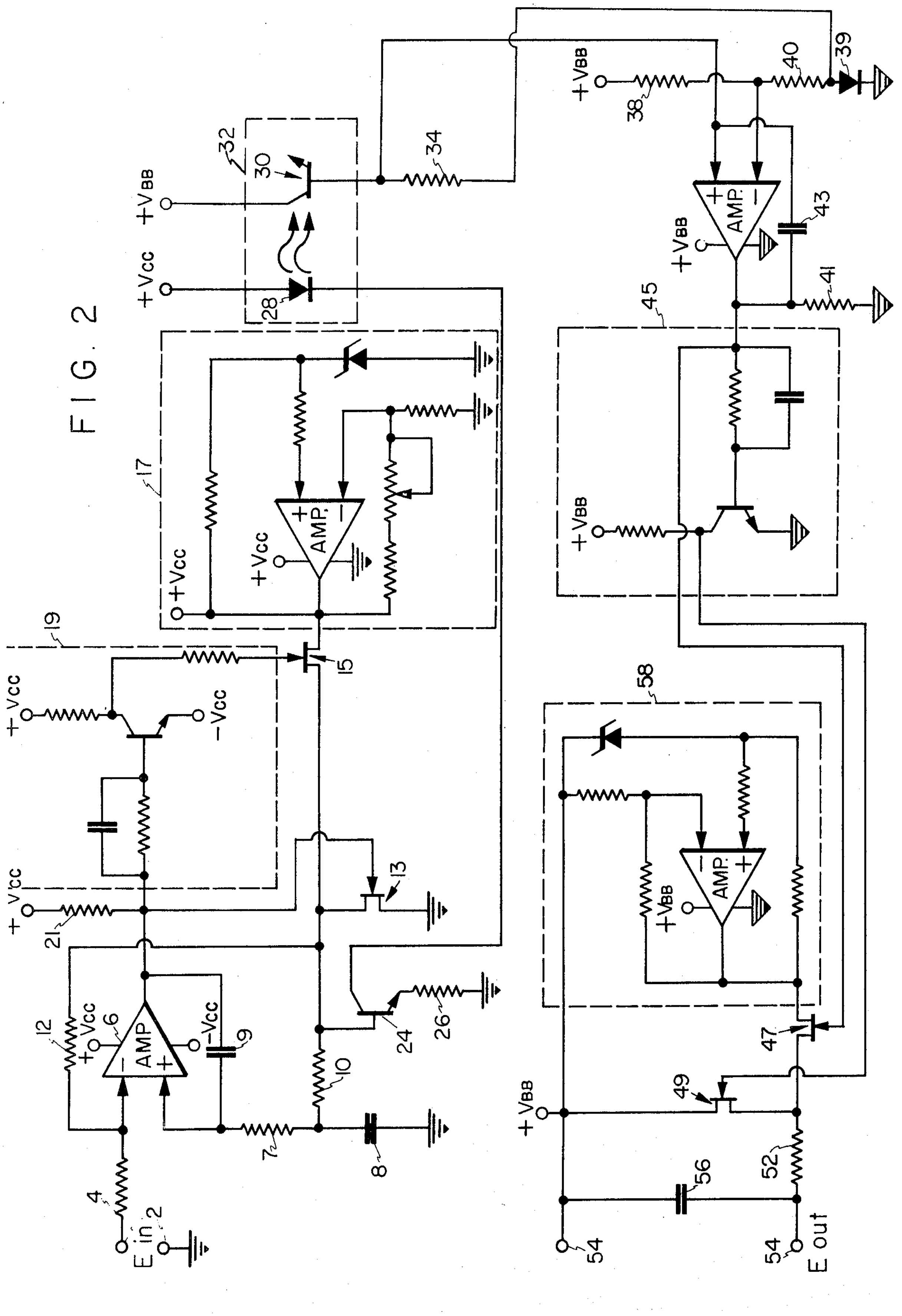
FIG. 2 is a schematic illustration of a modification of the circuit shown in FIG. 1 and also embodying the present invention.

In FIG. 2, there is shown a modification of the circuitry of the arithmetic circuit shown in FIG. 1 while also embodying the present invention. Specifically, the single-pole, double-throw switches 16 and 44 shown in FIG. 1 are replaced in FIG. 2 by electronic equivalents employing field effect transistors (FET's) which perform the switching function of the relay switches shown in FIG. 1. Also, the batteries 20 and 48 have been replaced by electronic circuitry (constant voltage units) providing constant voltage output signals. The remaining modifications to the circuitry from that shown in FIG. 1 are necessitated by the aforesaid basic changes in the circuitry of FIG. 1. Similar reference numbers have been utilized in FIG. 2 to indicate circuit elements common to both FIGS. 1 and 2. Thus, a pair of input terminals 2 are connected through an input resistor 4 to the inverting input of the first amplifier 6. The non-inverting input of the first amplifier 6 is connected through a serial combination of a resistor 7 and a capacitor 8 to a ground terminal and through a feedback capacitor 9 to an output circuit of the amplifier 6. The connection between the resistor 7 and the capacitor 8 is connected through a series combination of a resistor 10 and resistor 12 to the inverting input of the amplifier 6. The connection between the resistors 10 and 12 is connected to a first input terminal of each of a pair of FET's 13 and 15. It should be noted that in the following discussion, the switch, or current flow, terminals of the FET's are referred to as first and second input terminals while in actual use, of course, one terminal would be a drain and the other a source.

A second input terminal of the first FET 13 is connected to a first ground terminal while a second terminal of the second FET 15 is connected to a constant voltage source 17 using a Zener diode for providing a constant voltage reference signal. The output circuit of the first amplifier 6 is also connected to the control electrode of the first FET 13 and, through a signal inverter circuit 19, to the control electrode of the second FET 15. A source of potential +Vcc is connected through a resistor 21 to the output circuit of the amplifier 6 to provide a bias signal for application to the control electrode of the first FET 13 and to the signal inverter circuit 19. The connection between the resistors 10 and 12 is also connected to the base electrode of an output transistor 24. The transistor 24 has its emitter electrode connected through a resistor 26 to the first ground terminal. The collector electrode of the transistor 24 is connected through a light emitting diode 28 to the source of energizing potential +Vcc. The light emitting diode 28 is associated with a photo-diode 30 within a light-tight enclosure 32 as previously described. One side of a photo-diode 30 is connected to the source of energizing potential +Vbb while the other side of the photo-diode 30 is connected through a resistor 34 and a diode 39 to the ground terminal and directly to the noninverting input of a second amplifier 36A. The inverting input of the amplifier 36A is connected to the junction between a pair of serially connected resistors 38 and 40 with the series combination of the resistors 38 and 40 being connected between the source of potential +Vbb and a second ground terminal through a diode 39. An output circuit of an amplifier 36 is connected through a resistor 41 to the second ground terminal and through a feedback capacitor 43 to the non-inverting input of the amplifier 36. The output of the amplifier 36 is, also, connected to the input of a signal inverter circuit 45 and to the control electrode of a third FET 47. The output of the inverter circuit 45 is connected to the control electrode of a fourth FET 49 while a first input electrode of both of the FET's 47 and 49 is connected through an output resistor 52 to one of a pair of output terminals 54 having the output signal Eout appearing thereacross. The other one of the output terminal 54 is connected to the source of energizing potential +Vbb while a capacitor 56 is connected across the output terminals 54.

A second input terminal of the fourth FET 49 is connected to the potential source +Vbb while the second input of the third FET 47 is connected to the output of a constant voltage source 58 using a Zener diode for providing a constant voltage reference signal.

Figure 3:
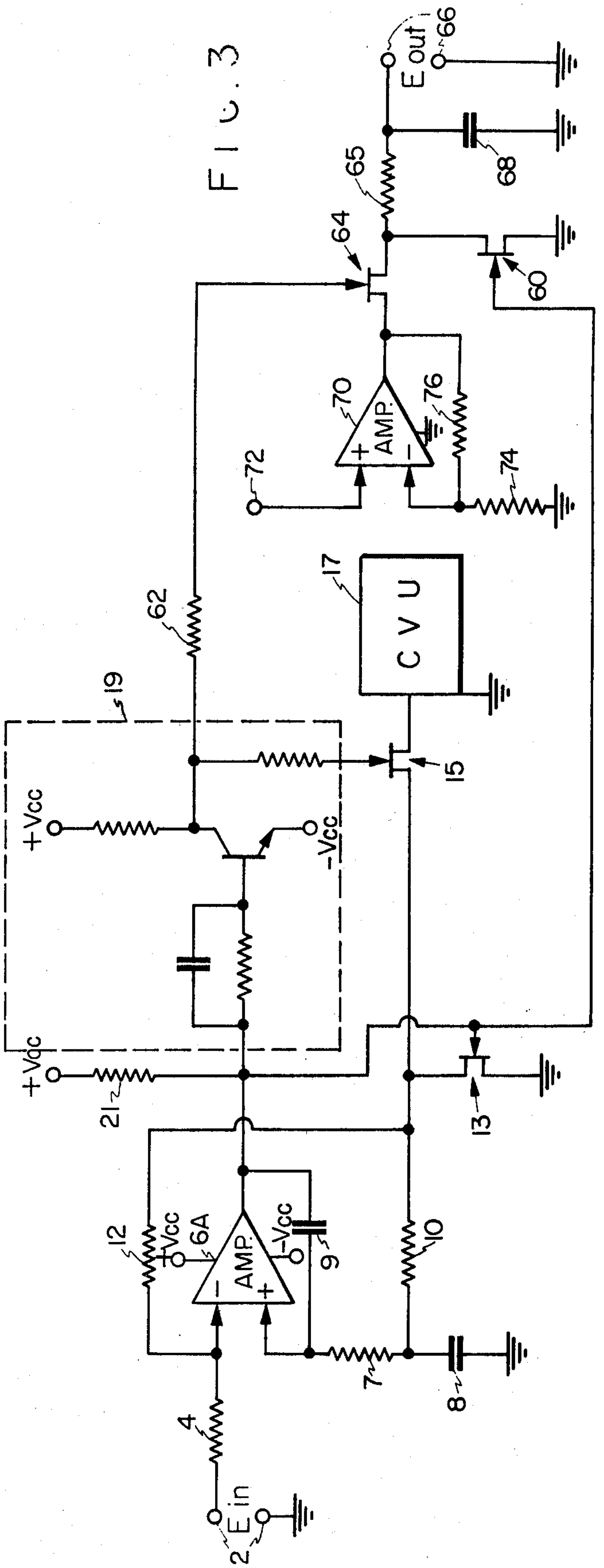
FIG. 3 is a further modification of the circuits shown in FIGS. 1 and 2 and also embodying the present invention.

The circuitry shown in FIG. 3 is another modification of the arithmetic circuit shown in FIG. 1 wherein the light emitting diode and the photo-diode have been omitted along with their associated circuitry. Here again similar reference numbers have been used for circuit elements common to FIGS. 1 and 3. Thus, a pair of input terminals 2 are provided, one of which is connected through an input resistor 4 to the inverting input of a first amplifier 6. The non-inverting input of the first amplifier 6 is connected through a serial combination of a resistor 7 and a capacitor 8 to a ground terminal and through a feedback capacitor 9 to an output circuit of the amplifier 6. The connection between the series combination of the resistor 7 and the capacitor 8 is connected through a series combination of a resistor 10 and a resistor 12 to the inverting input of the amplifier 6. The connection between the series combination of the resistors 10 and 12 is connected to a first input terminal of each of a pair of FET's 13 and 15. A second input terminal of the first FET 13 is connected to a ground terminal while a second input terminal of the second FET 15 is connected to the output circuit of a constant voltage unit 17. The output circuit of the first amplifier 6 is also connected to the control, or gate, electrode of the first FET 13 and, through a signal inverter circuit 19, to the control electrode of the second FET 15. A source of potential +V is connected through a resistor 21 to the output of the amplifier 6 to provide a bias signal for application to the control electrode of the first FET 13 and to the input circuit of the signal inverter circuit 19. The output circuit of the amplifier 6 is also connected to the control electrode of a third FET 60 having one of its input terminals connected to a ground terminal. An output circuit from the signal inverter 19 is also applied through a resistor 62 to the control electrode of a fourth FET 64. A second input terminal of the third FET 60 and the first input terminal of the fourth FET 64 are connected together at one end of an output resistor 65. The other end of the output resistor 65 is connected to one of a pair of output terminals 66 while the other one of the output terminals 66 is connected to a ground terminal. An output capacitor 68 is connected across the output terminals 66. A second input terminal of the fourth FET 64 is connected to the output circuit of a second amplifier 70. The amplifier 70 has its non-inverting input connected to a signal input terminal 72 while its inverting input is connected through a resistor 74 to a ground terminal and through a feedback resistor 76 to the output circuit of the amplifier 70.

MODE OF OPERATION

Referring initially to the arithmetic circuit shown in FIG. 1, the input signal applied to the input terminals 2 is effective to control the operation of the movable armature 14 of a switch 16 between the fixed switch terminals 18 and 22 with the switching time of the switch 16 being dependent on the amplitude of the input signal applied to the input terminals 2 as more fully described hereinafter. This switching action of the switch 16 is effective to periodically connect the constant voltage source 20 to the base electrode of the transistor 24 to control the current flow through the transistor 24 and, ultimately, the energization of the light emitting diode 28. Since the modulation is a duty cycle type of modulation, the control of the light emitting diode 28 by the transistor 24 is effective to produce an output from the photodiode 30 which is also a duty cycle modulated signal representative of the modulation produced by the switching of the switch 16. The output signal from the photo-diode 30 is applied to the amplifier 36 to produce a corresponding operation of the switch 44.

The operation of the switch 44 is effective to periodically connect the constant voltage source 48 to the capacitor 56 to charge the capacitor 56 during one position of the switch 14 and to discharge the capacitor 56 during the other position of the switch 44. Thus, the charge retained on the capacitor 56 is the average charge accumulated during the switching action of the switch 44. This accumulated signal retained on the capacitor 56 is a duplicate of the input signal applied to the input terminals 2 and is ultimately applied to the output terminal 54 as an output signal from the arithmetic circuit shown in FIG. 1. Further, the output signal on the output terminals 54 is conductively isolated from the input signal on the input terminals 2 by the optical isolator within the light-tight enclosure 32 while providing a reproduction of the amplitude of the input signal applied to the input terminals 2. The conversion of the amplitude of the input signal applied to the input terminal 2 to a duty cycle modulated signal is performed by the amplifier 6 and the circuitry associated therewith. Specifically, with a given direct current input signal $E_{in}$ the direct current feedback component of the negative feedback signal through the feedback resistor 10 must equal $E_{in}$ because of the closed loop around the amplifier 6. The direct current negative feedback voltage is developed by generating a rectangular wave form at the output from the armature 14 of the switch 16 by operating the switch 16 between the reference signal from the battery 20 and a ground terminal, i.e., between switch contacts 18 and 22. This direct current feedback signal is filtered by a low pass RC filter including the resistor 10 and the capacitor 8. The duty cycle of the switch 16 is controlled such that:

$$\left(\frac{t_{on}}{t_{on}+t_{off}}\right)V_{20}=E_{in}.$$

The duty cycle controlling action can be further understood by considering the positive feedback voltage to the positive input of the amplifier 6 through the resistor 12. This positive feedback voltage is added to the input signal to cause a small amount of the feedback voltage from the switch 16 to be super-imposed on $E_{in}$. The amplitude of this positive feedback voltage which is added to $E_{in}$ is determined by the proportion of the input resistor 4 and the feedback resistor 12 according to $$\left(\frac{R_4}{R_4+R_{12}}\right)V_{20}.$$

The input signal $E_{in}$ is divided by the proportion of resistor 4 to resistor 12 when the switch 16 is connected to ground terminal so that the net $E_{in}$ applied to the input of the amplifier 6 is less than the actual $E_{in}$ at the input terminals 2. Subsequently, when the switch 16 applies the aforesaid positive feedback signal, the net signal applied to the positive input of the amplifier 6 increases by the amount of the positive feedback signal from the aforesaid net $E_{in}$ applied to the amplifier 6. Thus, the E representative signal applied to the amplifier 6 is a rectangular wave signal centered on the actual $E_{in}$ signal, i.e., having equal excusions sabove and below the actual $E_{in}$ signal. Thus, the amplifier 6 is supplied with this rectangular wave signal rather than the constant amplitude direct current $E_{in}$ signal. Since the amplitude of this rectangular wave signal is as stated above, this signal amplitude is the area of indecision by the amplifier 6 when comparing the inputs on the positive and negative input terminals thereof and, hence, is the so-called deadband of the amplifier 6. If the deadband is much less than the battery level $V_{20}$, then the RC filter of the resistor 10 and the capacitor 8 integrates the output signal from the switch 16. The output signal from the RC filter is a triangular waveshape signal that is superimposed on the $E_{in}$ component of the feedback voltage applied to the amplifier 6 to the noninverting input thereof.

Since the duty cycle of switch is controlled, as previously defined, and the negative feedback signal has a direct current component which is equal to $E_{in}$, the triangular waveshape signal is centered on the $E_{in}$ component and has two slopes depending on whether the capacitor 8 is charging or discharging. During the charging of the capacitor 8, the slope is defined by $$\frac{V_{20}-E_{in}}{R_{10}\,C_8}$$

while the discharge slope is defined by $$\frac{-E_{in}}{R_{10}\,C_8}$$

since during the discharge cycle of the capacitor 8 the battery 20 is disconnected by the switch 16. However, since both slopes are controlled by the amplitude of the input signal, the time required for the triangular waveshape to pass through the deadband of the amplifier 6 is controlled by the input signal $E_{in}$. Whenever the voltage difference between the inputs of the amplifier 6 crosses the zero axis, the output signal of the amplifier 6 is arranged to change state and to operate the switch 16 from one position to the other, e.g., a zero axis crossing in the positive direction changes the position of the armature 14 from the switch contact 22 to the switch contact 18. This change in the position of the switch 16 causes the voltage at the output of the switch 16 to jump from zero volts to the voltage level of $V_{20}$. At the same time, the difference signal at the inputs to the amplifier 6 jumps in a positive direction by $$\left(\frac{R_4}{R_4+R_{12}}\right)V_{20}$$

and then starts down a ramp toward a zero level. When this decreasing amplifier input signal difference crosses the zero axis in the negative direction, the output of the amplifier 6 again changes state to operate the switch 16, i.e., to switch the armature 14 from the switch contact 18 to the switch contact 22. This position of the switch 16 causes the output signal from the switch 16 to drop to a zero level for a repetition of the aforesaid operation. The slopes of the difference signal at the input to the amplifier 6 are the same as those previously defined for the triangular waveform applied to the non-inverting input of the amplifier 6.

The duty cycle modulated output signal from the switch 16 is also used to drive a transistor 24 functioning as a current source, with a current limiting emitter resistor 26, to operate a light emitting diode 38 in the collector circuit of the transistor 24. The light emitting diode 28 generates light pulses in response to the duty cycle modulated energizing signal applied thereto. These light pulses are applied to a photodiode 30 to produce an increase in the current flow through the photodiode 30 by charging its internal impedance. This controlled current flow is used to generate a rectangular waveform output signal from a bridge circuit including the resistors 34, 38 and 40 with the photodiode 30 forming one leg of the bridge circuit and an amplifier 36 is connected across the output, or diagonal, of the bridge circuit. This rectangular waveform output signal is centered around zero volts to produce the same change in the output of the amplifier 36 as previously described for the amplifier 6, i.e., to operate the switch 44 from one state to the other at the same duty cycle as the switch 16. The operation of the switch 44 by the amplifier 44 produces a signal which is applied to an RC filter circuit including resistor 52 and capacitor 56. The direct current component of this switching voltage is recovered by this filter and appears across output capacitor 56, which capacitor is connected across the output terminals 54, to produce the output voltage $E_{out}$. The direct current component of the operation of the switch 44 is defined by $$\left(\frac{t_{on}}{t_{on}+t_{off}}\right)V_{48}.$$

If the reference signal from the battery 40 equals the reference signal from the battery 20 then $E_{out}$ equals $E_{in}$. Accordingly, this circuit transfers direct current analog signals using an optical coupler and isolator, and the conversion to duty cycle information does not require a constant frequency input signal. Further, since it is duty cycle information that is transferred from one circuit to the other the transferred information is not frequency dependent.

The operation and structure of the circuit shown in FIG. 2 is the same as that described above for FIG. 1 with the exception that the switch 16 is replaced by a pair of FET's 13, and 15. An output signal from an amplifier 6A is used to operate the first FET 13 by a direct connection to the control electrode of the FET 13 thereto while the second FET 15 is operated through a signal inverter circuit 19 whereby the FET's 13 and 15 are operated by opposite polarity output signals from the amplifier 6A. Thus, the alternate operation of the FET's 13 and 15 represent the switching of the switch 16 shown in FIG. 1 between the contacts 18 and 22. Additionally, the battery 20 is replaced by a constant voltage unit, or supply 17. Similarly, the switch 44 is replaced by a pair of FET's 47 and 49 which are operated by an output signal from the amplifier 36A applied directly and through an inverter circuit 45, respectively. Finally, the battery 48 is replaced by a constant signal source 58 similar to supply 17.

In FIG. 3, there is shown another embodiment of the present invention wherein the signal isolating means 32 shown in FIGS. 1 and 2 has been replaced by a direct electrical coupling of the duty cycle modulation section of the amplifier system to the demodulation section of the amplifier system. Since the optical isolator is eliminated from the circuit shown in FIG. 3, the control signals for the FET switches, previously discussed with respect to FIG. 2, are used in common between the first and second sets of FET switches to provide a synchronized switching action between the modulating and demodulating operation of the circuit. The modulating portion of the circuit shown in FIG. 3 is substantially identical to that shown in FIG. 2 and operates in a similar manner. The demodulating section of the amplifier circuit shown in FIG. 3 is modified from that shown in FIGS. 1 and 2 to include an amplifier 70 having its inverting, or negative, input connected in a negative feedback loop with the output of the amplifier 70 while its non-inverting, or positive, input is connected to an input terminal 72 arranged to be connected to a second source of input signals. The output signal from the amplifier 70 is applied to an input of one of the FET switches in place of the second constant reference signal source shown in FIGS. 1 and 2. Thus, the output of the amplifier 70 is switched into the output capacitor 68 to develop the output signal across the output terminal 66 in a matter similar to the switching of the second reference signal source in FIGS. 1 and 2.

While the circuit in FIG. 3 is specifically shown with a separate second input terminal 72 suitable for connection to a second source of input signals to the non-inverting input of the second amplifier 70, this modification is applicable to the circuits shown in FIGS. 1 and 2 by replacing the second constant signal source 78 or 56 shown in the demodulating section of the circuits illustrated in FIGS. 1 and 2 by a source of a desired input signal. The basic circuit shown in FIG. 3 may be arranged to perform various multiplication arithmetic operations by connecting the input terminals 2 and 72 to desired input signals. For example, if the same input signal is applied to the input terminals 2 and 72, the output signal $E_{out}$ is the square of the input signal. On the other hand, if different input signals are applied to the input terminals 2 and 72, the output signal $E_{out}$ is the product of the two input signals. Additionally, by using the circuit shown in FIG. 3 in an operative relationship with a operational amplifier, other arithmetic functions may be obtained. For example, the basic multiplier shown in FIG. 3 may be used in a negative feedback circuit with an operational amplifier while the output signal of the operational amplifier is applied to both innputs of the circuit shown in FIG. 3. If the output signal of the circuit shown in FIG. 3 is concurrently applied to the inverting input of the operational amplifier while another separate input signal is applied to the non-inverting input of the operational amplifier, then the output signal of the operational amplifier is representative of the square root of the input signal applied to the non-inverting input of the operational amplifier.

Accordingly, it may be seen that there has been provided an improved arithmetic circuit for providing a plurality of arithmetic operations while being suitable for use with a signal isolating element for electrically isolating the inputs and outputs of the arithmetic circuit.

The embodiments of the present invention in which an exclusive property or privilege is claimed are defined as follows:

1. A signal modulating circuit comprising
- a signal comparator means having a first input and a second input and arranged to produce an output signal representative of the difference between input signals applied to the first and second inputs,
- a source of a constant reference signal,
- signal storage means connected to the second input of said signal comparator means,
- first circuit means arranged to apply an input signal applied to said signal modulating circuit to said first input of said amplifier means,
- first switch means for selectively connecting an output signal from said constant reference signal source to said signal storage means,
- second circuit means arranged to apply said output signal from said first swtich means to said first input of said comparator means concurrently with said input signal,
- second switch means for selectively discharging said storage means, and
- switch control means responsive to an output signal from said amplifier means for closing said first switch means in response to a first state of an output signal from said amplifier means while opening said second switch means and for closing said second switch means in response to a second state of said output signal of said amplifier while opening said first switch means, said first and second switch means being alternately operated thereby.

2. A signal modulating circuit as set forth in claim 1 wherein said first and second switch means each include a field effect transistor and said last-mentioned means includes means for applying an output signal from said amplifier to said first switch means to control said field effect transistor therein and signal inverting means for applying an inverted form of said output signal from said amplifier to said second switch means to control said field effect transistor therein.

3. A signal modulating circuit as set forth in claim 1 wherein said signal storage means is a capacitor.

4. A signal modulating circuit as set forth in claim 1 an including an output means connected across said signal storage means to provide an output signal indicative of an average signal stored by said signal storage means.

5. A signal modulating circuit as set forth in claim 4 wherein said output means includes signal isolating means arranged to produce an output signal electrically isolated from said signal stored by said signal storage means.

6. A signal modulating circuit as set forth in claim 1 and including:
- a second pair of switch means having a third switch means operated in synchronism with said first switch means and a fourth switch means operated in synchronism with said second switch means,
- means for applying a second input signal to an input of said third switch means of said second pair of switch means,
- a second signal storage means,
- means connecting said second signal storage means to an output of said third switch means of said second pair of switch means, and
- means connecting said fourth switch means of said second pair of switch means to discharge said second signal storage means.

7. A signal modulating means as set forth in claim 5 wherein said output means further includes:
- a signal comparing means for comparing said output signal from said signal isolating means with a predetermined reference signal,
- a third switch means,
- a fourth switch means,
- means for operating said third switch means in synchronism with said first switch means and said fourth switch means in synchronism with said second switch means,
- a second source of constant reference signal,
- a second signal storage means,
- circuit means connecting said third switch means to apply said second signal source to said signal storage means, and
- means connecting said fourth switch means to discharge said second signal storage means.

* * * * *